United States Patent [19]

Fraser

[11] Patent Number: 4,472,902
[45] Date of Patent: Sep. 25, 1984

[54] FISHING AID

[76] Inventor: Colin F. Fraser, R.R. #1, Dryden, Ontario P8N 2Y4, Canada

[21] Appl. No.: 234,951

[22] Filed: Feb. 17, 1981

[51] Int. Cl.³ .................. A01K 97/00; A01K 97/01
[52] U.S. Cl. ........................... 43/43.11; 43/44.95; 24/115 F; 24/488; 24/567
[58] Field of Search ............ 43/17, 20, 43.11, 43.12, 43/44.95, 54.5 R, 54.5 A, 42.72; 24/115 F, 201 TR, 244

[56] References Cited

U.S. PATENT DOCUMENTS

| 1,819,034 | 8/1931 | Luelloff | 43/17 |
| 2,325,861 | 8/1943 | Kreb | 43/20 |
| 2,772,503 | 12/1956 | Keller | 43/17 |
| 3,407,528 | 10/1968 | Lenning | 43/42.72 |
| 3,974,589 | 8/1976 | Henze et al. | 43/43.12 |

FOREIGN PATENT DOCUMENTS 895334  1/1945  France ................. 24/201 TR

Primary Examiner—James G. Smith
Assistant Examiner—K. Bradford Adolphson
Attorney, Agent, or Firm—Sim & McBurney

[57] ABSTRACT

There is provided a fishing aid which includes a body, means on the body for attaching one end of a fishing line thereto, and a slot in the body into which the fishing line can be inserted. Within the slot is biased retention means for holding the line in the slot when no tension is on the line, and for releasing the line from the slot when the line tension tending to pull the line out of the slot exceeds a predetermined level. In a preferred form, the biased retention means may include a first and a second member, each movable within respective passageways which are oriented transversely to the slot, with springs or similar members urging the first and second members into positions blocking the slot.

4 Claims, 5 Drawing Figures

FISHING AID

This invention relates generally to the art of fishing, and has to do particularly with a line holder for controlling the fishing line until release is desired. This device finds particular use in ice fishing, but is not to be considered limited thereto.

BACKGROUND OF THIS INVENTION

The common equipment presently used for ice fishing is a length of line attached to a pole. One disadvantage of this conventional arrangement is that when the fish takes the bait and/or hook, the line is under immediate tension which may result in breakage of the line or loss of the bait and/or hook. When a rod and reel are used for fishing in cold weather, there is a tendency for the reel to freeze up and become inoperable.

GENERAL DESCRIPTION OF THIS INVENTION

In view of the foregoing disadvantages of conventional practice, this invention provides a fishing aid which includes a body having means for attaching one end of the fishing line to the body, and having a slot in the body into which the fishing line can be inserted. The slot has an outer open end and an inner closed end, and the fishing line passes into the slot from the open end.

The fishing aid further includes biasing retention means in the slot for holding the line in the slot when no tension is on the line, and for releasing the line from the slot when the line tension tending to pull the line out of the slot exceeds a predetermined level.

More particularly, and in one preferred embodiment, the biased retention means may include a member movable within a passageway oriented substantially transversely to the slot, with spring means urging the movable member toward a position blocking the slot. Preferably, the movable member is a stop or detent, which may be a ball or other rounded member.

Again in another preferred embodiment, there are two movable ball members within separate passageways, both oriented substantially transversely to the slot, with separate spring means urging the two balls toward blocking positions with respect to the slot. Also in a preferred embodiment, the spring means are adjustable so that one of them can be given a release pressure different from the other, for reasons which will appear subsequently.

GENERAL DESCRIPTION OF THE DRAWINGS

Three embodiments of this invention are illustrated in the accompanying drawings, in which like numerals denote like parts throughout the several views, and in which.

DETAILED DESCRIPTION OF THE DRAWINGS

Figure 1:
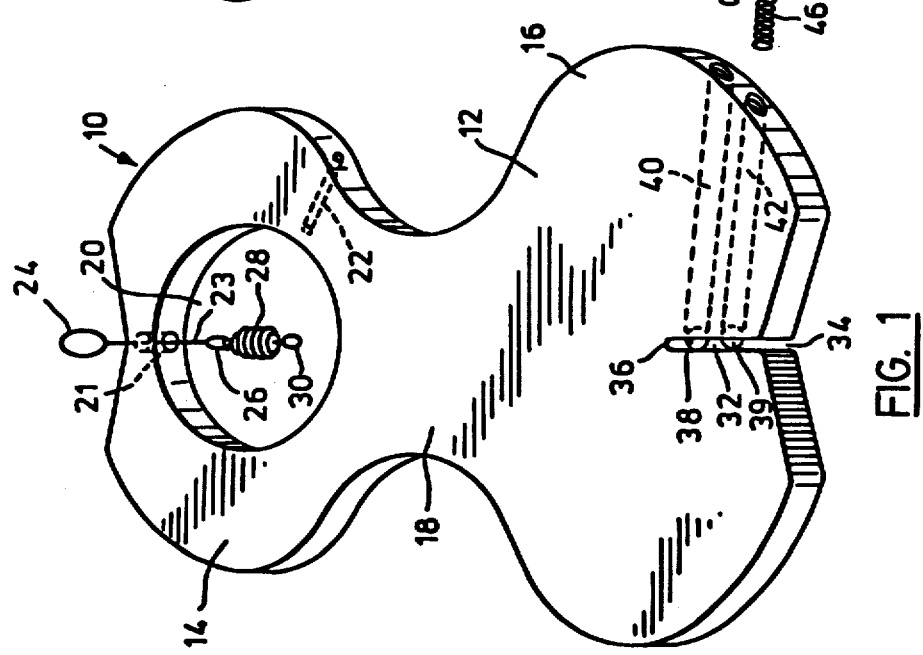
FIG. 1 is a perspective view of a fishing aid constructed in accordance with this invention, with certain portions thereof partly exploded.

FIG. 1 shows a fishing aid 10 which includes a body 12 having a substantially hourglass shape which includes an upper section 14 and a lower section 16, these two sections 14 and 16 being joined through a waist portion 18.

In the upper section 14 of the body 12 is an opening 20, and two bore holes 21 and 22 are provided in the upper section 14, both bore holes 21 and 22 communicating the opening 20 with the outer perimeter of the upper section 14. Through the bore hole 21 passes a length of strong wire 23 or the like, having a loop 24 at the upper end and a further loop 26 at the lower end. To the loop 26 is attached a spring 28, itself having a loop 30 at the bottom, for a purpose which will subsequently be explained.

The other bore hole 22 is of much smaller diameter, and is intended to receive one end of the fishing line, which is passed through the bore hole 22 from the outside toward the opening 20, and then tied in a knot on the inside so that it cannot be pulled outwardly through the bore hole 22. The further manipulation of the fishing line in connection with this fishing aid will be described subsequently.

In the lower section 16 of the body 12 is provided a slot 32 which has an outer open end 34 and an inner closed end 36. The slot 32 is large enough that a typical fishing line can be inserted into it from the open end 34.

The fishing aid described herein also includes biased retention means in or associated with the slot 32, the retention means being capable of holding the fishing line in the slot 32 when no tension is on the line, but being capable of releasing the line from the slot when line tension tending to pull the line out of the slot exceeds a predetermined level.

More particularly, the biased retention means described above includes a first ball member 38 and a second ball member 39, each movable within a respective passageway 40 and 42, the passageways 40 and 42 being oriented substantially transversely to the slot 32, and being large enough in bore to slidably receive the ball members 38 and 39, respectively.

Spring means are provided for urging the ball members 38 and 39 in a movable manner towards positions blocking the slot 32. More particularly, there is provided a first spring member 44 adapted to be inserted slidably into the passageway 40, and a second spring member 46 adapted to be inserted slidably into the passageway 42.

Also provided are two set screws 48 and 49, which may be in the form of allen or set screws, adapted to be threaded into the passageways 40 and 42, which would have a suitable internal thread to match the set screws. An allen wrench or screw driver would be used to adjust the position of the set screws 48 and 49, whereby to adjust the compression of the spring members 44 and 46, thus adjusting the force with which each of the balls 38 and 39 is urged against the leftward side of the slot 32, as pictured in FIG. 1.

In normal use, the pressure of the ball member 38 against the leftward side of the slot 32 is greater than that for the ball member 39. By way of example, the lower ball member 39 may be set to release the fishing line at a one quarter pound pull, whereas the upper ball may be set to release the fishing line at a one and one half pound pull.

The use of the embodiment shown in FIG. 1 will now be described. A fishing line has its one end inserted through the bore hole 22, and when the end has passed into the opening 20, it is tied into a knot so that the fishing line cannot be again retracted through the bore hole 22.

The bulk of the fishing line is then wrapped around the waist portion 18 of the body 12, and the free end thereof may be secured by placing it into the slot 32. This arrangement would be that prior to actual use during fishing. When not being used for fishing, the free end of the line may be simply left hanging from the slot 32, or when a fish hook is attached to that end, the hook may be rendered safe by hooking into the loop 30 at the end of the spring 28 in the opening 20.

Figure 5:
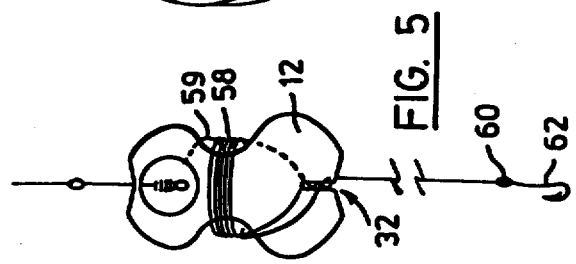
FIG. 5 is an elevational view, to a smaller scale, of the first embodiment of this invention when used with a fishing line.

When the operator wishes to utilize the device during fishing, the free end is affixed to a fishing hook and sinker, if such is not already the case. The operator unwraps the desired amount of line, corresponding to the amount of line which he intends the fish to "run out" with before the device provides the necessary jerk to "set" the hook into the fish's mouth. Then, seven to ten additional wraps are unwound and the line is placed into the slot 32 above the upper ball member 38. Next, the remaining line is again rewrapped onto the body of the device, around the waist portion 18, following which the last portion of the line is inserted into the slot 32 between the upper ball member 38 and the lower ball member 39. It is understood that, after this procedure, there will still be sufficient line remaining to allow the hook and sinker, after baiting, to drop down into the water to the desired depth. As seen in FIG. 5, the device itself is tied to a separate line through the loop 24. The spring 28 is too large to pass through the bore hole 21, and this keeps the device in place on the separate line.

When the fish initially takes the bait and hook into his mouth, the relatively small pull exerted on the line as the fishing line passes the lower ball member 39 is not sufficient to fully set the hook in the fish's mouth. The lower ball member 39 is merely intended to hold the fishing line such that the hook with the bait is at the proper depth, and is intended to release the line with a relatively slight resistance as soon as the fish takes the bait.

As the fish runs away with the bait, the line will pay off the body 12 of the device, with the device normally spinning. When an amount of line has been taken out by the fish which corresponds to the amount of line wrapped between the two successive snaggings of the line in the slot 32, the line will come up against the upper ball member 38, and in order to pull the line past the upper ball member 38, a relatively strong pull must be exerted on the line. The momentum of the fish provides this pull, but in so doing the hook is set into the fish's mouth. The line is then drawn in and the fish is caught.

Figure 2:
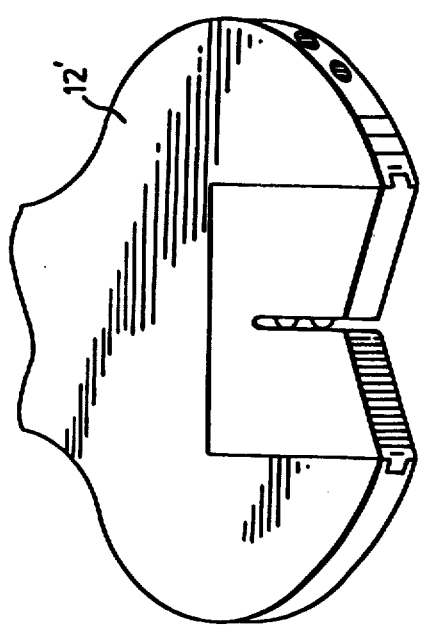
FIG. 2 is a partial view of a fishing aid incorporating the second embodiment of this invention.

Turning now to FIG. 2, it will be seen that the only difference between the embodiment there shown and that already described with respect to FIG. 1, is the fact that the slot is provided in a removable component 51, forming part of the device. The removable component 51 is generally rectangular in shape, except for the bottom edge, which has the shape of an obtuse angled bend, the same as the lower part of the body 12 in FIG. 1. The component 51 has a tongue-and-groove fit with the remainder of the body 12', and can be seen to incorporate tongues 53 along the side edges thereof.

Aside from the removability of the component 51, the remainder of the construction for the embodiment of FIG. 2 is the same as that for FIG. 1.

The same passageways, spring members, set screws and ball members are provided as with the first embodiment. Because of this similarity, it is not necessary to describe all of these elements a second time.

Figure 3:
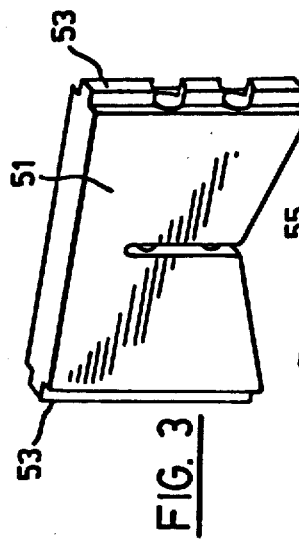
FIG. 3 is a perspective view of one component of the second embodiment of this invention.
Figure 4:
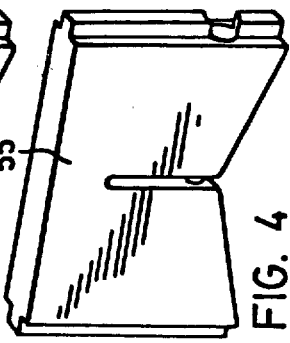
FIG. 4 is a perspective view of a component of the third embodiment of this invention.

By having the component 51 in FIG. 3 removable from the body 12' shown in FIG. 2, it is possible to replace the component 51 with a component 55 shown in FIG. 4 which includes only a single ball member, and a single passageway aligned therewith. This embodiment is provided in cases where the fisherman wishes to set the hook immediately into the fish's mouth.

FIG. 5 shows the device of FIG. 1 in condition for fishing. A fishing line 58 has one end 59 inserted through the bore hole 22 (see FIG. 1), and tied. Then a predetermined length of the fishing line 58 is wrapped around the waist portion of the body 12, then passed into the slot 32 up to the top thereof, then again wrapped around the waist portion of the body 12, then again passed into the slot 32 between the two ball members, then extending downwardly for attachment to a sinker 60 and a hook 62. The customary leader (not shown) may also be provided.

As indicated above, in the embodiments described, the biased retention means may include a movable member, which preferably is a stop or detent. This stop or detent may be a ball or other rounded member.

I claim:

1. A fishing aid comprising:
   a body,
   means on the body for attaching one end of a fishing line to the body,
   a slot in the body having an outer open end and an inner closed end, the fishing line being insertable into the slot from said open end,
   and biased retention means in the slot for holding the line in the slot when no tension is on the line, and for releasing the line from the slot when the line tension tending to pull the line out of the slot exceeds a predetermined level,
   the biased retention means including a first member movable within a first passageway oriented substantially transversely to the slot, the first passageway being spaced from the closed end of the slot, and a second member movable within a second passageway oriented substantially transversely to the slot, the second passageway being spaced further than the first passageway from the closed end of the slot, and first and second spring means in the first and second passageways respectively, said first and second spring means urging the first and second movable members respectively toward positions blocking the slot.

2. The fishing aid claimed in claim 1, in which said first and second members are stops, and in which the force of each spring means is separately adjustable.

3. The fishing aid claimed in claim 2, in which threaded means are provided for adjusting the force of each spring means, the force applied to the first member being greater than the force applied to the second member.

4. The fishing aid claimed in claim 1, in which the body is plate-like and substantially hourglass-shaped having two sections joined through a waist portion, so that the fishing line may be wrapped around said waist portion, the first-mentioned means being located in one section and the slot being located in the other section.

* * * * *